US011354450B1

(12) United States Patent
Michalevsky et al.

(10) Patent No.: US 11,354,450 B1
(45) Date of Patent: Jun. 7, 2022

(54) APPARATUS AND METHOD FOR EFFICIENT AND SECURE PROCESS FORMATION ON SECURE RUNTIME HARDWARE RESOURCES

(71) Applicant: Anjuna Security, Inc., Palo Alto, CA (US)

(72) Inventors: Yan Michalevsky, Palo Alto, CA (US); Boris Mittelberg, Palo Alto, CA (US); Thomas Aprelev, Palo Alto, CA (US)

(73) Assignee: Anjuna Security, Inc., Palo Alto, CA (US)

( * ) Notice: Subject to any disclaimer, the term of this patent is extended or adjusted under 35 U.S.C. 154(b) by 0 days.

(21) Appl. No.: 17/189,683

(22) Filed: Mar. 2, 2021

(51) Int. Cl.
*G06F 21/00* (2013.01)
*G06F 21/71* (2013.01)
*H04L 9/08* (2006.01)
*G06F 21/76* (2013.01)

(52) U.S. Cl.
CPC .............. *G06F 21/71* (2013.01); *H04L 9/085* (2013.01); *G06F 21/76* (2013.01)

(58) Field of Classification Search
CPC ........... G06F 21/71; G06F 21/76; H04L 9/085
See application file for complete search history.

(56) References Cited

U.S. PATENT DOCUMENTS

2015/0172259 A1* 6/2015 Consalus ............. H04L 63/168
713/150
2015/0332043 A1* 11/2015 Russello ............. G06F 11/3466
726/22

2019/0102567 A1* 4/2019 Lemay .................... G06F 21/44
2020/0389295 A1* 12/2020 Almeida ............... H04L 9/0897
2021/0064643 A1* 3/2021 Folland .................. G06F 40/56
2021/0263713 A1* 8/2021 Milojicic ................. G06F 8/71
2021/0319142 A1* 10/2021 Kärkkäinen ........ G06F 12/1408

FOREIGN PATENT DOCUMENTS

EP 3761202 A1 * 1/2021 ........... G06F 21/575

OTHER PUBLICATIONS

Baumann et al., "Shielding Applications from an Untrusted Cloud with Haven", ACM Transactions on Computer Systems, vol. 33, Issue 3, September (Year: 2015).*

* cited by examiner

*Primary Examiner* — Morshed Mehedi
(74) *Attorney, Agent, or Firm* — Cooley LLP (57) ABSTRACT

A non-transitory computer readable storage medium has instructions executed by a processor to define a parent application executing on a secure runtime hardware resource. A state snapshot of the secure runtime hardware resource is maintained. A fork request for a child application to be derived from the parent application is received. An updated state snapshot of the state snapshot is formed. The child application is instantiated. Encrypted state is transferred from the parent application to the child application. The encrypted state is used to derive an encryption key shared by the parent application and the child application. The encrypted state in the child application is decrypted using the encryption key to spawn an independent child application operative as an additional secure runtime instance. The parent application on the secure runtime hardware resource and the child application operative as the additional secure runtime instance are executed independently.

7 Claims, 5 Drawing Sheets

APPARATUS AND METHOD FOR EFFICIENT AND SECURE PROCESS FORMATION ON SECURE RUNTIME HARDWARE RESOURCES

FIELD OF THE INVENTION

This invention relates generally to process execution on computer hardware resources. More particularly, this invention is directed toward techniques for efficient and secure process formation by software using secure enclaves and Trusted Execution Environments (TEE) supported by hardware or software.

BACKGROUND OF THE INVENTION

Cloud-based computing environments have changed traditional approaches to securing various computing devices and enterprises. As computing and data storage activities are performed by remote devices, security and privacy issues arise because the remote devices are typically controlled by another organization and may be less secure than local devices.

Existing systems encrypt stored data and encrypt data prior to communication to another device or system. However, these existing systems generally do not encrypt data when it is being used by an application or other process. When data is used by applications or processes, it generally needs to be decrypted for runtime processing. This decrypted data presents a security issue during runtime by potentially exposing the decrypted data to unauthorized users or unauthorized systems.

There are a variety of techniques used to protect decrypted data during runtime. Trusted Execution Environments (TEEs) include Software Guard Extensions (SGX) sold by Intel® and Secure Encrypted Virtualization (SEV) sold by AMD®, which establish hardware enclaves for safe execution of decrypted data during runtime. Enclave features include confidentiality and integrity protection for the enclave's virtual address space, restricting control flow into well-defined entry points for an enclave, integrity checking memory contents, and remote attestation.

Virtual enclaves are also available depending on a hypervisor's ability to segment and isolate memory. All of these solutions are collectively referred to as enclaved applications or secure runtime hardware resources.

It is difficult to fork processes in enclaved applications. There are known interactive protocols between parent and child enclaves that support forked processes. Such protocols utilize memory inefficiently and introduce security vulnerabilities.

Thus, there is a need for efficient and secure process formation within enclaved applications.

SUMMARY OF THE INVENTION

A non-transitory computer readable storage medium has instructions executed by a processor to define a parent application executing on a secure runtime hardware resource. A state snapshot of the secure runtime hardware resource is maintained. A fork request for a child application to be derived from the parent application is received. An updated state snapshot of the state snapshot is formed. The child application is instantiated. Encrypted state is transferred from the parent application to the child application. The encrypted state is used to derive an encryption key shared by the parent application and the child application. The encrypted state in the child application is decrypted using the encryption key to spawn an independent child application operative as an additional secure runtime instance. The parent application on the secure runtime hardware resource and the child application operative as the additional secure runtime instance are executed independently.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The invention is directed toward efficient and secure process formation within enclaved applications. The fork, vfork and clone system calls are intercepted to start snapshot capturing and child process spawning. The invention addresses the need to resume the execution of the parent process as soon as possible by reconstructing the state at the child process asynchronously. Copy-on-write techniques are used to minimize the time that the parent process is frozen. The disclosed techniques provide authenticated encryption of data, while prioritizing encryption of certain pages on demand when the parent process attempts to write to them. The disclosed techniques may be used in connection with the migration of enclaves or virtual machines across hosts.

Figure 1:
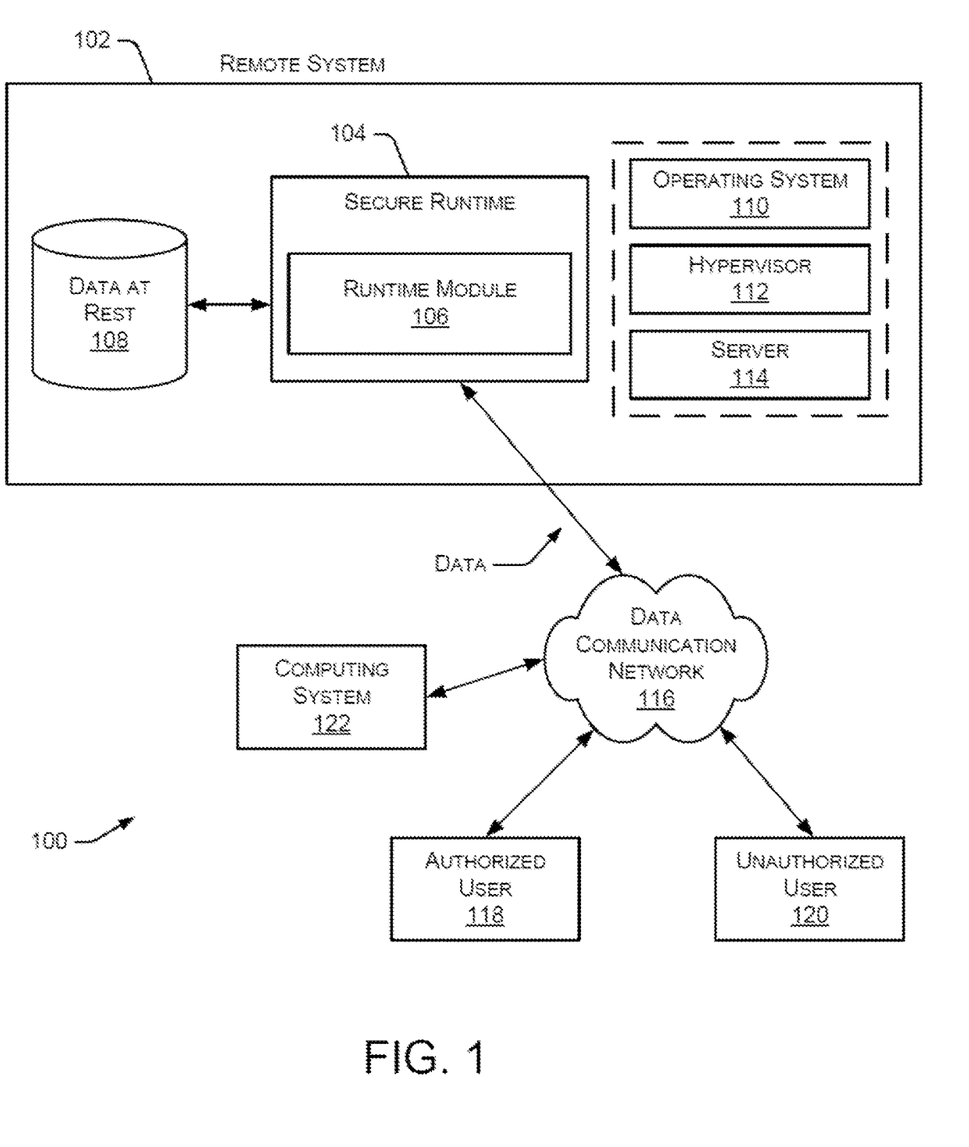
FIG. 1 illustrates a distributed system configured in accordance with an embodiment of the invention.

FIG. 1 is a block diagram illustrating an example environment 100 in which the described systems and methods are implemented. A remote system 102 is coupled to one or more authorized users 118, one or more unauthorized users 120, and one or more computing systems 122 via a data communication network 116. Data communication network 116 includes any type of network topology using any communication protocol. Additionally, data communication network 116 may include a combination of two or more communication networks. In some embodiments, data communication network 116 includes a cellular communication network, the Internet, a local area network, a wide area network, or any other communication network.

Computing system 122 includes any type of computing device that interacts with remote system 102. In some embodiments, remote system 102 may be a cloud-based computing system that is accessible by computing system 122 to execute various operations on behalf of computing system 122. In some embodiments, remote system 102 includes a secure runtime 104 and a data storage device 108 that stores data at rest. Remote system 102 may also include one or more virtual machines that are hosted by (and implemented on) one or more servers 114, each of which implements one or more operating systems 110 and implements one or more hypervisors 112.

Secure runtime 104 provides a platform for secure and private computing in a public cloud environment. Secure runtime 104 may include a runtime module 106, as discussed herein. In some embodiments, secure runtime 104 secures the runtime server applications (and the associated data) running inside individual secure enclaves on a host. Secure runtime 104 also provides memory isolation by isolating memory associated with an application from other components and processes running on the host. This isolation also includes isolating the memory from the operating system. In some embodiments, the data associated with a particular application stays within the secure enclave when the data is not encrypted. The data is always encrypted before it is communicated out of the secure enclave. Additionally, other systems and users cannot access the memory, even if they have root or physical access to the host system.

In some embodiments, secure runtime 104 also ensures a trusted channel to a backend server application, which provides security by validating that the expected code is executing in the expected Trusted Execution Environment. Additionally, the use of remote attestation provides computing system 122 and other enterprises with a cryptographic assurance that their clients are communicating directly with remote system 102 and no other entity, system, or user can access the applications and their associated data.

Figure 2:
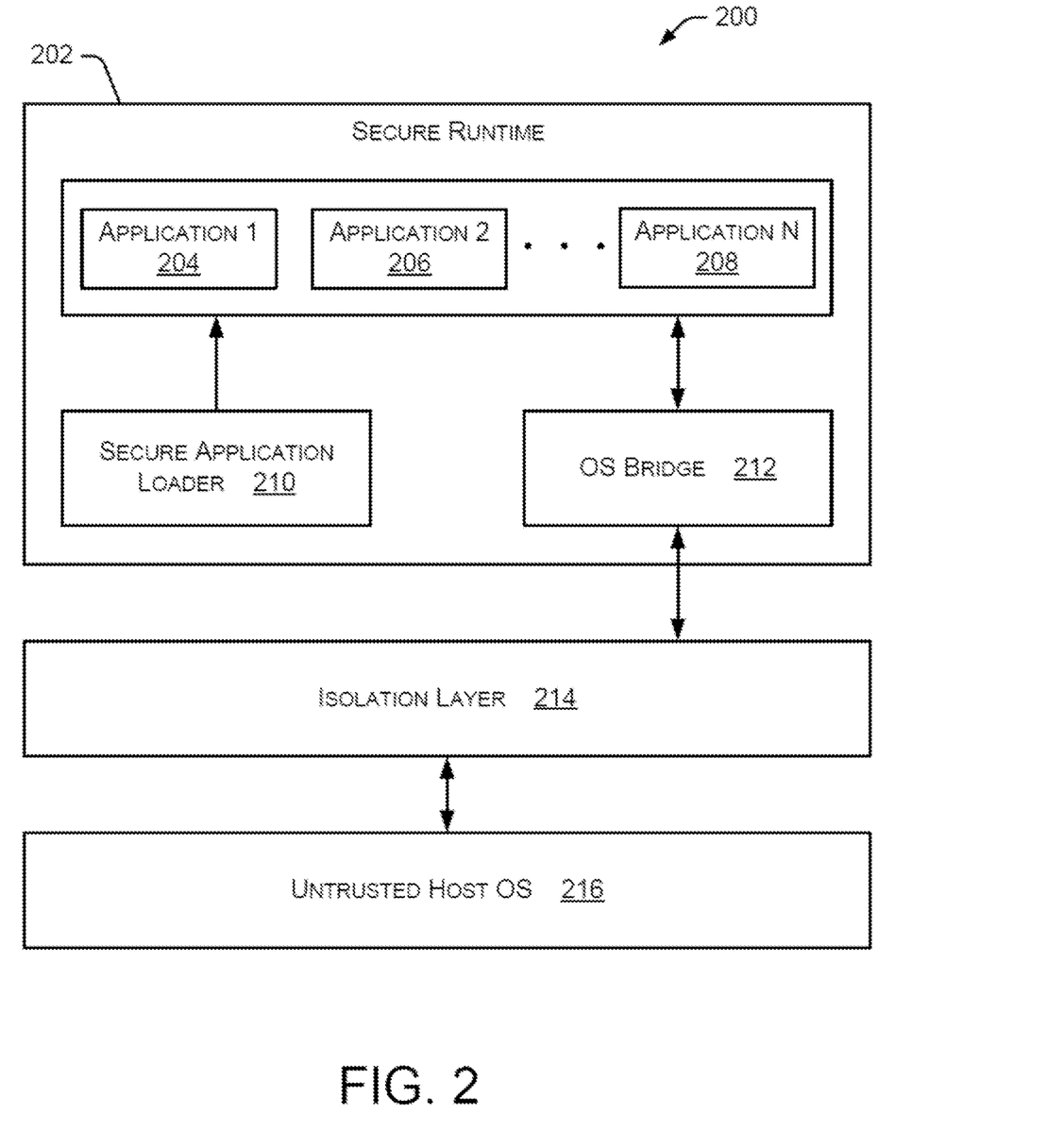
FIG. 2 illustrates a secure runtime configured in accordance with an embodiment of the invention.

FIG. 2 illustrates an embodiment of a secure runtime structure 200. A secure runtime 202 includes any number of applications 204, 206, and 208. In some embodiments, each application 204, 206, and 208 is executing in a separate enclave. In other embodiments, two or more of applications 204, 206, and 208 are executing in the same secure enclave. In particular implementations, for applications that use shared memory and are compiled as Position Independent Code (PIC), the described systems and methods may run two processes in a single secure enclave. Secure runtime 202 also includes a secure application loader 210 (also referred to as a "router") and an OS bridge 212. In some embodiments, secure application loader 210 is capable of running binary executables in an isolated and shielded environment. Secure application loader 210 may load each application 204-208 into secure runtime 202 along with all of the libraries that each application depends on to execute.

An isolation layer 214 is positioned between secure runtime 202 and an untrusted host OS 216. This isolation layer 214 operates to isolate the applications 204, 206, and 208 from untrusted host OS 216. Although isolation layer 214 is shown separately in FIG. 2, it represents the underlying hardware or virtualization technologies provided by specific hardware processors. Isolation layer 214 is not necessarily a specific entity. Instead, isolation layer 214 represents the isolation provided by the technique of loading applications in a manner that the applications are executing in an enclave and the applications are isolated from any other execution content. In some embodiments, isolation layer 214 is based on hardware features that provide hardware-grade security and privacy. Example hardware features include SGX (Software Guard Extensions) and SEV (Secure Encrypted Virtualization).

As discussed herein, each application 204-208 can create an isolated encrypted memory area that is not accessible to (or visible to the) kernel. In some embodiments, the systems and methods described herein create a small kernel for each application 204-208 that provides the OS services needed by each application, but executing within the secure enclave. For example, OS bridge 212 may provide OS services to applications 204-208. These OS services may include writing to a disk or other storage system, starting a network connection, and other types of system calls. Additionally, OS bridge 212 may apply encryption to data and other information used by applications 204-208 within secure runtime 202.

In some embodiments, secure runtime structure 200 is used as a cloud-based backend system which provides seamless migration of workloads between, for example, computing system 122 and remote system 102. In a specific implementation, secure runtime structure 200 includes one or more "enclaved" applications that support high-level language runtimes, which provides simplicity and general functionality for processing data. This allows a secure webserver to serve sensitive content directly to an authorized user 118 in a manner that prevents the cloud-based system operator from accessing the content or other data.

As discussed herein, secure runtime 202 allows sensitive applications to execute securely in remote locations and within the public cloud. Secure runtime 202 provides flexibility by avoiding the need for rigid server security zones, while minimizing the reliance on hardware security modules. In some embodiments, secure runtime 202 enables secure deployment of unmodified applications, including secure communication between multiple secure enclaves, resource allocation, and monitoring.

In some implementations, secure runtime 202 protects against "zero-day exploits" by executing applications inside a secure enclave. These applications are protected from malware that penetrates the host with escalated privileges. Thus, secure runtime 202 provides a perimeter around the individual executing application instead of a larger perimeter around a virtual machine or a host.

In particular embodiments, secure runtime 202 provides a benefit to privately hosted clouds and data centers through security and operational flexibility. For example, secure runtime 202 allows remote clients to communicate directly with the secure micro services, which reduces critical operational concerns. In some embodiments, secure runtime 202 also avoids the need for rigid security zones that might result in over-provisioned or underutilized server infrastructure.

In some embodiments, the systems and methods described herein can work with any hardware device that supports secure enclaves. These systems and methods offer a common API that works with any hardware device from any manufacturer. The use of a common API simplifies the creation and management of systems that support execution of one or more applications in secure enclaves. Rather than learning specific techniques associated with each type of hardware device, the common API allows a developer, system administrator, or other person or entity to learn a single API that works on all hardware devices.

In virtualized environments, system calls may be intercepted by a hypervisor and passed to the host OS via hypercalls, which is an interface between the guest virtual machine and the part of the hypervisor running on the host. In these virtualized environments, the systems and methods described herein intercept system call by executing the application within a hypervisor and handling the SYSCALL instruction as a privileged instruction which is trapped by the guest kernel that may handle it internally or pass it through to the hypervisor.

In some embodiments, by intercepting the system calls, the described systems and methods do not require special adaptation for applications to run on top of different hardware types or different hypervisor platforms.

Any number of methods may be used to intercept system calls. For example, system calls can be intercepted using a patched version of glibc, a library used by many Linux applications. Other methods include handling SIGILL signals to intercept a system call originated from within an enclave.

Figure 3:
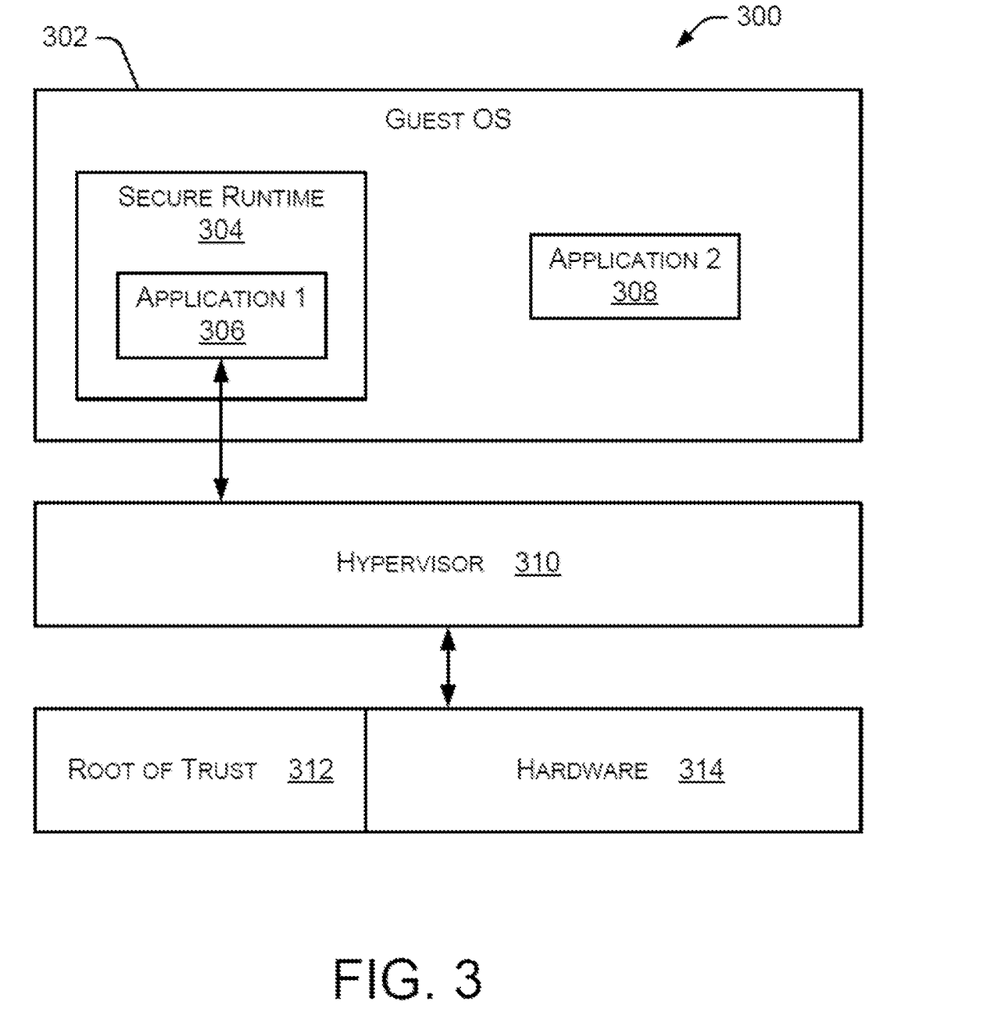
FIG. 3 illustrates a secure runtime executing on a guest operating system in accordance with an embodiment of the invention.

FIG. 3 illustrates an embodiment of a host OS implementing a secure runtime structure 300. A guest OS 302 includes a secure runtime 304 with a first application 306 executing within secure runtime 304. A second application 308 is executing within guest OS 302. As shown in FIG. 3, application 306 is executing within secure runtime 304 and is, therefore, protected from any malicious attempt to access its data by the other application 308 that is not executing within secure runtime 304.

In the example of FIG. 3, a hypervisor 310 is coupled to guest OS 302. Additionally, a root of trust 312 is associated with a hardware component or device 314. A root of trust is a set of functions or code in a trusted computing module of hardware 314 and is always trusted by the OS. The example of FIG. 3 represents the configuration of a secure enclave in which the root of trust 312 is provided by a manufacturer of hardware 314. In other embodiments that are configured as a virtual enclave, the root of trust 312 is associated with hypervisor 310.

Figure 4A:
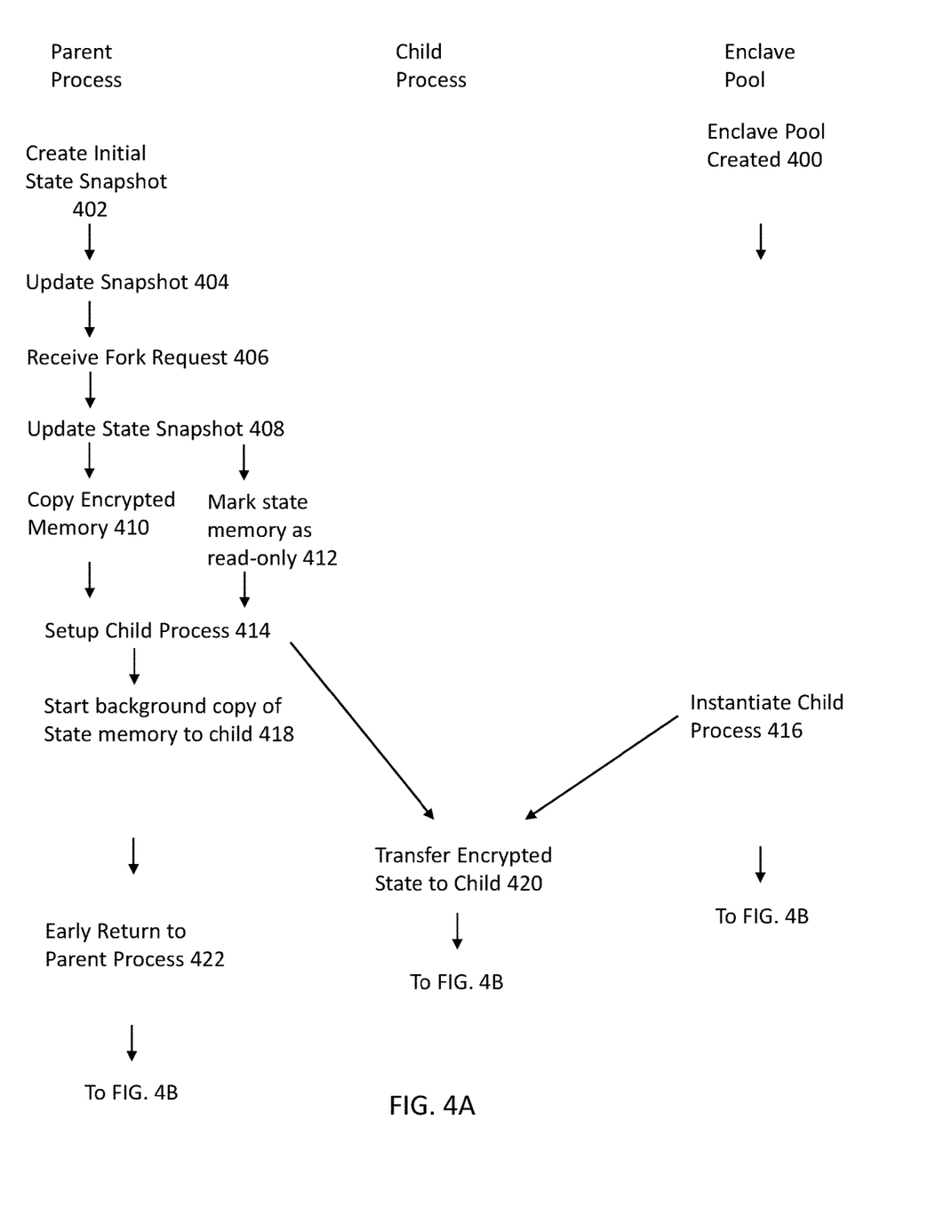
FIGS. 4A-4B illustrate fork operations performed in a secure runtime in accordance with an embodiment of the invention.
Figure 4B:
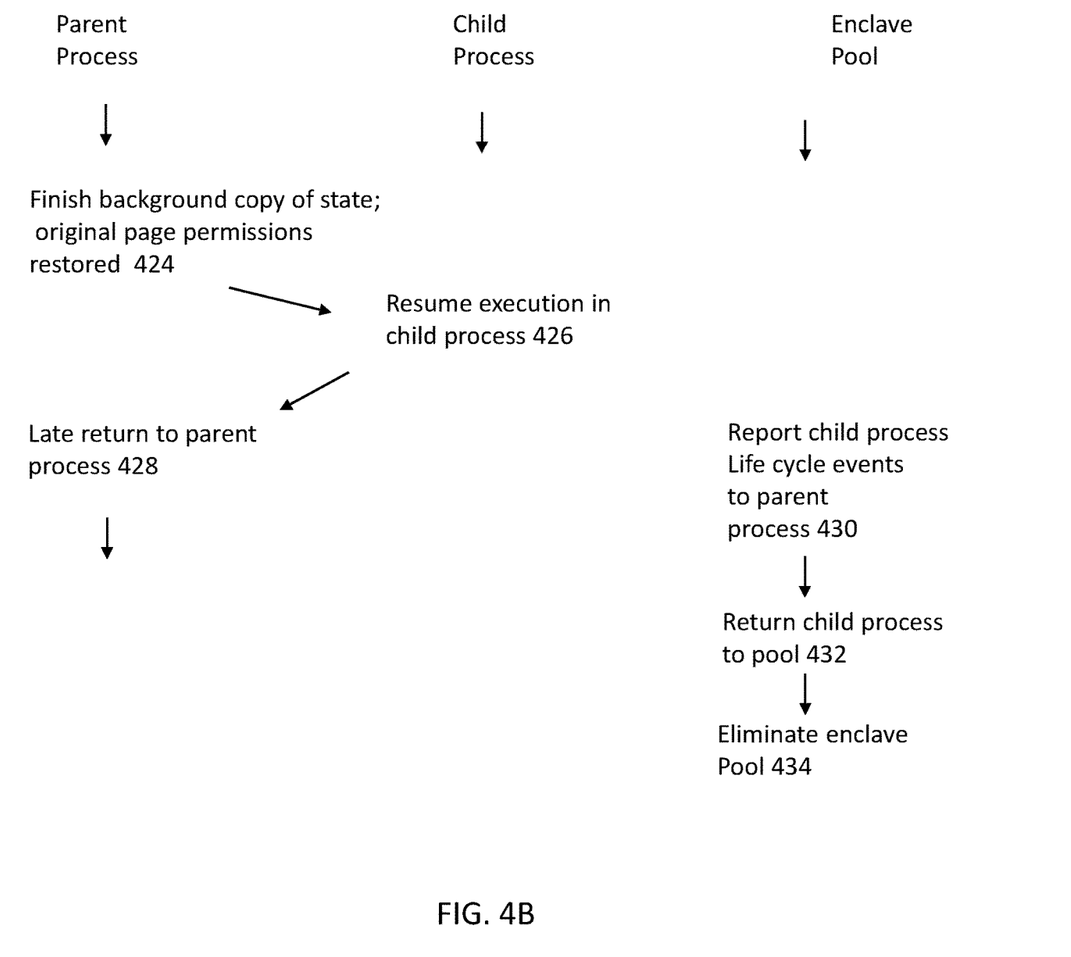

FIGS. 4A-4B illustrate operations to fork a child process from a parent process in an enclave or secure runtime. As shown in FIG. 4A, initially an enclave pool is created 400. A parent process creates an initial state snapshot 402.

The snapshot is periodically updated 404. A fork request is received 406. The fork( ) system call in Linux clones a process, creating a child process with a different process identifier (PID), which enables the child to distinguish itself from the parent. Forking is challenging in an enclave environment. Since the native Linux copy-on-write mechanism cannot be applied directly to enclave memory, the enclave runtime software has to implement an alternative method for transferring its state to the child process.

Without host support of copy-on-write sharing, the runtime emulates fork ( ) by migrating the process state via copying. When an application forks a process, the current runtime instance holds a list of process resources to copy to the new process. By checkpointing the process states, the runtime creates a snapshot of the current process, which is expected to be the initial state of the new process. A process snapshot includes all allocated resources, such as allocated virtual memory ranges and file descriptors, and miscellaneous process states, such as signal handlers. After checkpointing, the runtime calls fork ( ) or vfork( ) to create a new process in the host, and then transfer an encrypted process snapshot using either shared memory, a file, a pipe or UNIX socket.

When forking is completed, the child process sees the same memory-content as the parent and has the same virtual memory layout. When the child process updates its memory content, it affects only the child and not the parent, meaning that, at the time of a fork, an identical but separate version of the process is created, and from that point on, the two evolve independently.

Another contribution of this invention is its avoidance of lengthy checkpointing by having the runtime already establish an initial state snapshot 402 and an updated snapshot 404 when the fork request is received 406. In one embodiment, the runtime ignores the parent process accesses to memory while the clone operation is in progress. The runtime has the ability to protect access to some pages and execute custom logic when accesses occur.

The runtime uses a copy-on-write technique to avoid having to wait for dumping the entire enclave memory to complete the fork system call. The technique reduces the latency during dumping memory state.

The state of the runtime comprises a few parts. First, there is the untrusted runtime memory, including (a) untrusted stack, also used to pass OCALL parameters, (b) OS-allocated or registered resources: open file descriptors, pipes, signal handlers etc. (c) all the structures associated with enclave creation (d) configuration (parsed manifest, runtime options), and (e) switchless-ocall handling (i) Only one thread is copied over during fork. Fork is not switchless. So even if there are pending switchless ocalls from other threads in the queue, there is nothing meaningful in switchless context for the current thread (ii) the switchless queue from other threads will never be consumed in the child process, because those threads do not exist in child process, and (iii) this is why the runtime should not copy any context of switchless subsystem.

The second state of the runtime is the trusted runtime memory, which can be acquired either by checkpointing or by copying the following memory areas: runtime code, data and stack, and the current thread's Thread Local Storage (TLS). It includes: Virtual Memory Areas (VMAs), file-handle maps, threads (any helper threads, like switchless), loaded shared libraries and signal handlers, that the executable registered (part of the thread structure).

The third state of the Runtime is the executable memory and registers.

For a single-threaded application one can capture the state by copying all application memory and registers at the time of the clone/fork system call. For multi-threaded applications, it is possible for other application threads to change the application state while the snapshot is being created. This concern can be ignored, or all other threads can be stopped while the snapshot is created, or memory changes may be tracked while the snapshot is created or memory changes can be prevented while the snapshot is created.

The next operation of FIG. 4A is to copy encrypted memory 410. The memory may be copied to untrusted storage. For example, a buffer may be allocated for the state that needs to be copied. An encryption key is prepared. The state is encrypted on-the-fly using the encryption key. In the case of SGX, an SGX sealing key derived using the MRENCLAVE policy may be used on both ends independently and without interaction. This eliminates the need to transfer the key over a secure authenticated channel. Another option is for the parent to generate a random key and transmit it upon request to the child enclave over an authenticated encrypted channel established through local-attestation. In one embodiment, multiple threads copy the memory out of the enclave.

All of the memory that has to be copied to the child process is set to read-only 412. Typically, a copy-on-write is implemented using a page table by marking certain pages of memory as read-only and keeping a count of the number of references to the page. When data is written to these pages, the kernel intercepts the write attempt and allocates a new physical page, initialized with the copy-on-write data, although the allocation can be skipped if there is only one reference. The kernel then updates the page table with the new page, decrements the number of references, and performs the write. The new allocation ensures that a change in the memory of one process is not visible in another process.

Next, a child process is setup 414 in the parent process and a child process is instantiated 416 in the enclave pool.

In one embodiment, a new process is created using the fork (or equivalent clone) system call. In this case, the child process inherits all the kernel-managed objects and a complete copy of the untrusted state (code, stack, globals, thread-local storage). In the child process, the runtime is not functional until the memory region is unmapped, re-mapped, a new enclave is initialized or created, the switchless worker threads are re-created EENTER is called to restore the state of the enclave using the encrypted parent state (stored in untrusted memory) and EENTER is called to resume the execution of the child enclave. Since the untrusted state is completely preserved, it is possible that some enclave-related structures can be reused instead of recreated from scratch.

In another embodiment, a "warm enclave" is borrowed. The warm enclave is a process created at some earlier time, which is kept alive until needed. The parent enclave can send a message (e.g., pipe or socket) to a warm enclave that is already set up. Since the warm enclave is created at an earlier time, its state is very different than the parent enclave state. The following steps make the child process ready to resume the application as if a clone or fork command was executed. First, the untrusted state is restored. This includes the stack, thread-local storage, globals, heap and all kernel managed objects. Next it is ensured that encrypted parent enclave state is accessible to this process. Finally, the enclave state is restored using the encrypted parent enclave state.

In both cases, when restoring the state of the enclave, there might be some state that is not exactly identical to the parent enclave. In one embodiment, the trusted Runtime caches some information which could become invalid and needs to be reset. For example, the child process would have a new PID (TID for the main thread), and this information would either need to be updated (with the new correct value) or reset in some way so the runtime knows to get the new real value and cache it.

When using a warm enclave, the numbering scheme for PID/TID does not follow the usual pattern (increasing number, low probability of ID reuse). This might not be an issue for most applications, but if required, the runtime could create a "virtual" PID/TID and remap them so that the application being protected does not see any change in those patterns.

After the child process is setup 414, background copy of state memory is started 418. In one embodiment, a background thread in the parent process performed attestation. A background thread starts to copy all the memory pages identified in operation 408 to the child process.

Encrypted state is then transferred to the child process 420. State can be represented by a set of memory ranges. State updates are encrypted and decrypted in the enclaves with the same identity. Consequently, there is no key passing. That is, since the child process has the same initial identity as the parent process, a separate key exchange protocol need not be observed, resulting in a timely return to the parent process.

In one embodiment, the virtual patch memory range is reserved in the parent process before the enclave has started. After fork, the parent process maps a fresh physical memory at the same virtual address using MAP_FIXED. Such an mmap implicitly discards the previously mapped memory, leaving the child process with the only reference. The child process disposes of its reference using the same MAP_FIXED technique releasing the physical memory once its state has been restored.

The state patcher partitions the state memory ranges into page-sized subranges (forming "slices") and encrypts them in parallel batches. When configured with N additional threads, the state patcher forms (N+1) batches containing even amounts of slices and encrypts the first N of them asynchronously.

The state patch contains an unencrypted header (encryption policy and the patch encryption key request) and a set of slices. Each state patch is encrypted on a fresh key; the keys are derived via EGETKEY and depend on either or both the enclave and the vendor identities (MRENCLAVE and MRSIGNER). Each slice contains an encrypted payload, a subrange address, a subrange size and a stage. Each state slice is encrypted and authenticated using AES-128-GCM.

The state patcher encrypts batches asynchronously. Instead of producing a patch tag, the state patcher secures a patch by:

Each slice is authenticated with GCM tag, so a valid patch must only has valid slices (the tags of invalid slices will not verify)

The key is produced within the child enclave, so a valid patch must be produced by the enclave with the same identity The key depends on a random patch identifier obtained using the RDRAND instruction, or from any other reliable source of entropy, so a valid patch only has slices from the same original patch (a slice from a different patch will not verify because it was encrypted on a different key)

The tag depends on the total number of slices in the patch, so a valid patch must preserve the number of slices A valid patch must preserve the order of slices (otherwise the actual sequence of nonces will not match the expected one).

In sum, for a non-empty patch to be valid, it has to comprise all valid slices from the same enclave from a single patch in the same order.

Restoring encrypted state requires metadata about the location of the state. The transfer process includes generating a decryption key and populating the enclave memory with the provided state. The transferred state might include additional information that is not relevant to the child process. For example, the following should be invalidated or updated: all TLS structures (not including the current thread) should be invalidated so the child process will be able to create many threads and switchless queues should be emptied. Finally, free memory is allocated for state transfer. Unneeded parts of memory may be cleaned up either before or after copying to the child process. To make the copy procedure page-aligned and more efficient, one can clean up the state after it is copied to the child process.

There is then an early return to the parent process 422. The return is early in the sense that the child process is not ready for execution. The processing of FIG. 4A then proceeds to FIG. 4B. The background copy of state is finished and original page permissions are restored 424. When the transfer is done, a special notification is sent to the child process so that it can start execution. Execution in the child process is then resumed 426. That is, registers are restored and the child process is independent with its own state. There is then a late return to the parent process 428. Operation 422 references an early return to the parent process because the child process was not independent at that point. The child process is independent at this later return point.

Optionally, the enclave pool can report child process life cycle events to the parent process 430. Reporting events may be that the child process is ready to execute the next instructions, the child process calls execve (when vfork is used for example) and the child process exits.

Optionally, the child process may be returned to the enclave pool 432. That is, child process memory should be cleaned up and the enclave itself should be returned to the enclave pool. A final optional operation is to eliminate the enclave pool 434.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by a processor to:
    define a parent application executing on a secure runtime hardware resource;
    maintain a state snapshot of the secure runtime hardware resource;
    receive a fork request for a child application to be derived from the parent application;
    form an updated state snapshot of the state snapshot;
    instantiate the child application;
    transfer encrypted state from the parent application to the child application, wherein the encrypted state is used to derive an encryption key shared by the parent application and the child application;
    decrypt the encrypted state in the child application using the encryption key to spawn an independent child application operative as an additional secure runtime instance; and
    independently execute the parent application on the secure runtime hardware resource and the child application operative as the additional secure runtime instance.

2. The non-transitory computer readable storage medium of claim 1 wherein the instructions to maintain the state snapshot include instructions to create an initial state snapshot and instructions to update the initial state snapshot.

3. The non-transitory computer readable storage medium of claim 1 wherein the updated snapshot is formed with a copy-on-write mechanism that marks state memory as read-only memory.

4. The non-transitory computer readable storage medium of claim 1 wherein the instructions to instantiate the child application instantiate a warm child application with original state that grows stale.

5. The non-transitory computer readable storage medium of claim 1 wherein the encrypted state includes encrypted batches formed in parallel.

6. The non-transitory computer readable storage medium of claim 1 further comprising instructions executed by the processor to report child application life cycle events to the parent application.

7. The non-transitory computer readable storage medium of claim 1 further comprising instructions executed by the processor to return the child application to an enclave pool.

* * * * *